United States Patent [19]
Burov et al.

[11] Patent Number: 6,150,750
[45] Date of Patent: *Nov. 21, 2000

[54] PIEZOELECTRIC LINEAR STEP MOTOR

[75] Inventors: Sergey Vyacheslavovich Burov, Arkhangelsk; Jury Vladimirovich Okatov, Severodvinsk, both of Russian Federation

[73] Assignee: Samsung Electronics Co., Ltd., Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 09/011,133

[22] PCT Filed: Jun. 5, 1997

[86] PCT No.: PCT/RU97/00180

§ 371 Date: Feb. 4, 1998

§ 102(e) Date: Feb. 4, 1998

[87] PCT Pub. No.: WO97/47075

PCT Pub. Date: Dec. 11, 1997

[30] Foreign Application Priority Data

Jun. 5, 1996 [RU] Russian Federation ............. 96111326

[51] Int. Cl.⁷ .................................................. H01L 41/08
[52] U.S. Cl. ...................................... 310/328; 310/323.02
[58] Field of Search ................................... 310/323, 328, 310/323.82

[56] References Cited

U.S. PATENT DOCUMENTS

| | | | |
|---|---|---|---|
| 5,043,621 | 8/1991 | Culp | 310/316 |
| 5,068,566 | 11/1991 | Culp | 310/328 |
| 5,136,201 | 8/1992 | Culp | 310/328 |
| 5,144,187 | 9/1992 | Culp | 310/328 |
| 5,182,484 | 1/1993 | Culp | 310/328 |
| 5,241,235 | 8/1993 | Culp | 310/328 |
| 5,273,238 | 12/1993 | Sato | 244/105 |

FOREIGN PATENT DOCUMENTS

| | | |
|---|---|---|
| 0112454 | 10/1983 | European Pat. Off. . |
| 0360975 | 4/1990 | European Pat. Off. . |
| 60-002081 | 8/1985 | Japan . |
| 60-082072 | 10/1985 | Japan . |
| 573828 | 10/1977 | U.S.S.R. . |
| 738016 | 5/1980 | U.S.S.R. . |

*Primary Examiner*—Nestor Ramirez
*Assistant Examiner*—Peter Medley
*Attorney, Agent, or Firm*—Piper Marbury Rudnick & Wolfe

[57] ABSTRACT

A piezoelectric linear stepping motor comprises a cylindrical housing (1), a movable part (4) and fixing devices between them. The fixing devices comprise at least two piezoelectric units (2,3). Each piezoelectric unit (2,3) consists of a shifting (5) and a fixing (6) piezoelectric cells, insulators (7) and a friction element (8). The piezoelectric units (2,3) are disposed inside the housing (1) one behind the other in a longitudinal plane.

21 Claims, 3 Drawing Sheets

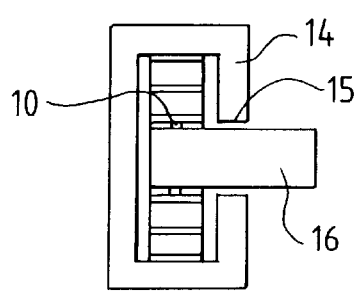
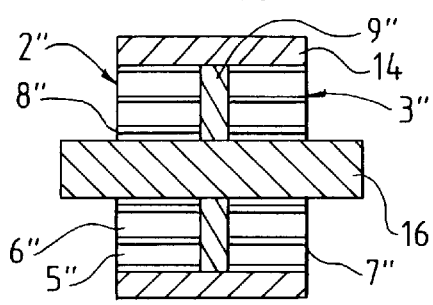
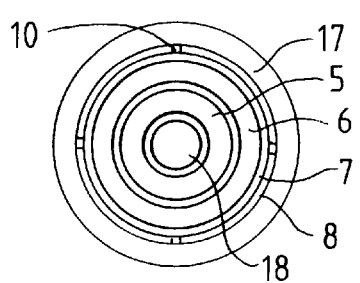
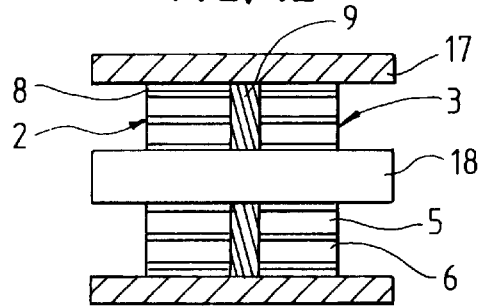
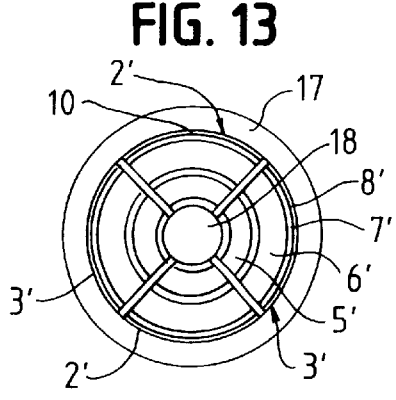
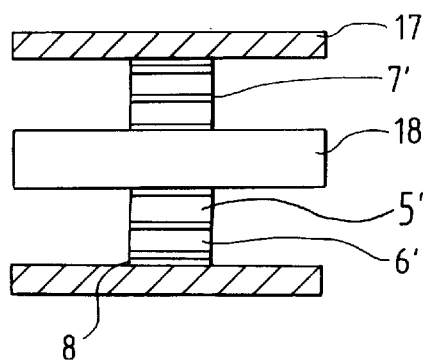

PIEZOELECTRIC LINEAR STEP MOTOR

TECHNICAL FIELD

The present invention relates to the field of electric motors and, more particularly, the invention relates to piezoelectric stepping motors.

BACKGROUND OF THE INVENTION

Known in the art is a linear stepping motor comprising a guide, a housing and a mover in the form of plates secured in the housing at an angle to the inner surface and frictionally interacting with the guide (SU, A, 801145).

However, this stepping motor has large overall dimensions and mass and performs the movement with the help of elastic plates, in which case it is impossible to obtain high forces and provide an accurate positioning.

Also known in the art is a piezoelectric linear stepping motor comprising a housing having fixing units secured in it and a movable part with a working member (SU, A, 720576).

However, this piezoelectric motor has a great number of components, a complicated design and is complicative in manufacturing fixing units, and its movable part is liable to an accidental turn in the process of linear displacement.

SUMMARY OF THE INVENTION

The basic object of the present invention is to create a linear piezoelectric stepping motor which constructive embodiment would make it possible to simplify the design and manufacturing technology, to obtain high forces at small dimensions and mass of the motor and to increase the accuracy in positioning the movable part.

This object is achieved by providing a piezoelectric linear stepping motor comprising a housing having fixing units and a movable part, in which motor, according to the invention, the fixing units comprise at least two piezoelectric units, each piezoelectric unit comprising a shifting piezoelectric cell and a fixing piezoelectric cell separated from each another, from the housing and from the friction element by insulators, the piezoelectric units are arranged inside the housing one behind the other in a longitudinal plane or in one transverse plane and have a form of sectors.

The housing may have a form of a parallelepiped, the piezoelectric units may be made in the form of parallelepipeds and disposed one behind the other in the longitudinal plane, and the movable part may be made in the form of a rod having a rectangular cross section.

The housing may also have a form of a polyhedron, and the piezoelectric units may be arranged in one transverse plane.

The housing may have cut-out, through which the movable part goes outside the housing.

The movable part may have at least one guide which enters a respective guide on the friction elements.

It is desirable for the motor to have at least two pairs of piezoelectric units disposed in the transverse plane.

The piezoelectric cells may be made in the form of a packet of piezoelectric plates, rings or their sectors which electrodes are connected in parallel alternately, in which case the direction of polarization of each successive piezoelectric plate, ring, or sector is opposite to that of the previous one.

The gaps between the piezoelectric units are preferably filled with an elastic insulating material.

The housing may be movable and the piezoelectric units may be fixed on a stationary rod.

Such constructive embodiment of the piezoelectric linear stepping motor being patented makes it possible to simplify the construction and manufacturing technology, to obtain high forces at a small size and mass and to increase the accuracy in positioning the movable part.

BRIEF DESCRIPTION OF THE DRAWINGS

The invention is further described by way of example with reference to the appended drawings, in which:

FIG.9 is a front view of the fifth embodiment of the motor;

FIG.10 is a longitudinal section of the motor shown in FIG.5;

FIG.11 is a front view of the sixth embodiment of the motor;

FIG.12 is a longitudinal section of the motor shown in FIG.11;

FIG.13 is a front view of the seventh embodiment of the motor;

FIG.14 is a longitudinal section of the motor shown in FIG.13;

THE BEST EMBODIMENTS OF THE INVENTION

Figure 1:
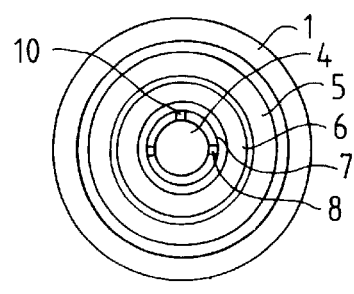
FIG.1 is a front view of the claimed piezoelectric linear stepping motor (the first embodiment)
Figure 2:
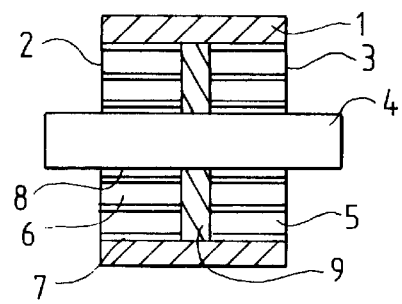
FIG.2 is a longitudinal section of the motor shown in FIG.1.

The piezoelectric linear stepping motor according to the first embodiment of the invention comprises a cylindrical housing 1 (FIG.1) having inside two piezoelectric units 2 (FIG.2) and 3 and a movable part 4 in the form of a cylindrical rod. The piezoelectric units 2 and 3 are rigidly secured to the internal surface of the cylindrical housing 1.

Each piezoelectric unit 2 and 3, respectively, consists of a shifting piezoelectric cell 5, a fixing piezoelectric cell 6, insulators 7 and a friction element 8 jointed together.

Each shifting piezoelectric cell 5 has a vector of its initial polarization directed at an angle to the longitudinal axis of the motor. And the fixing piezoelectric cells 6 have a vector of their initial polarization directed perpendicularly to the longitudinal axis of the motor.

The insulators 7 provide insulation of the shifting 5 and fixing 6 piezoelectric cells from each other and from the housing 1 and the friction element 8. The friction element 8 is split to provide tighter squeezing of the movable part 4 by the piezoelectric units 2 and 3.

Each piezoelectric cell has electrodes connected to wires (not shown in the drawing).

The gaps between the piezoelectric units 2 and 3 are filled with an elastic insulating material 9.

On the surface of the movable part 4 a guide 10 (FIG. 1) is made which enters the corresponding guide on the friction elements 8. The guide 10 excludes a possibility of the radial displacement of the cylindrical rod.

Other embodiments of the piezoelectric linear stepping motor, according to the invention, are possible. In these embodiments, character 2'–9', 2"–9", and 2'"–9'", respectively, represent parts analogous to those represented by characters 2–9, respectively, of the first embodiment.

Figure 3:
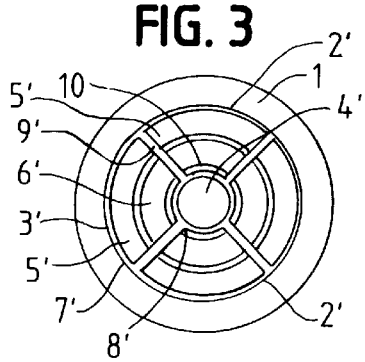
FIG.3 is a front view of the second embodiment of the motor.
Figure 4:
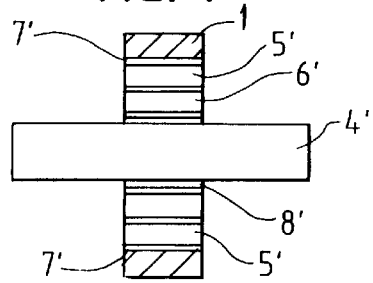
FIG.4 is a longitudinal section of the motor shown in FIG.3.

In the second embodiment of the motor, in contrast with the first embodiment, piezoelectric units 2' (FIGS.3 and 4) and 3' are disposed in one transverse plane and made in the form of sectors. This considerably reduces the overall dimensions and mass of the motor.

Figure 5:
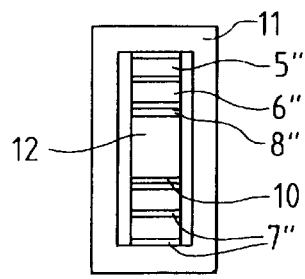
FIG.5 is a front view of the third embodiment of the motor.
Figure 6:
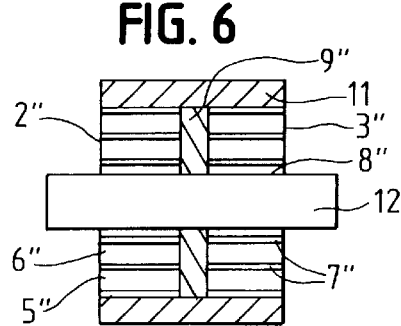
FIG.6 is a longitudinal section of the motor shown in FIG.5.
Figure 7:
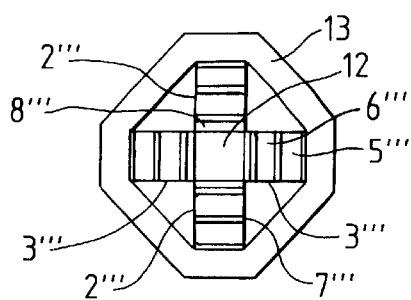
FIG.7 is a front view of the fourth embodiment of the motor.
Figure 8:
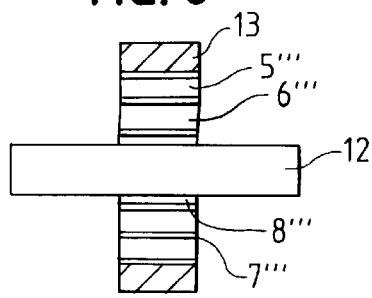
FIG.8 is a longitudinal section of the motor shown in FIG.5.

The third embodiment of the motor, having characters 2"–9" differs from the first one by the form of the housing and the movable part, as well as by a construction of the piezoelectric units and cells that is simpler in manufacture. The housing 11 (FIGS.5 and 6) has a form of a parallelepiped and the movable part is made in the form of a rod 12 of a rectangular cross section.

In the fourth embodiment of the motor the housing 13 is made in the form of a polyhedron and piezoelectric units 2'" and 3'" are disposed in one transverse plane.

In the fifth embodiment of the motor the housing 14 (FIGS.5 and 10) has a cut-out 15, through which the movable part 16 goes out of the housing 14. The design of piezoelectric units 2" and 3" is similar to that of the third embodiment.

In the sixth embodiment the movable element is the housing 17 (FIGS. 11 and 12) and the stationary element is a bar 18, to which the piezoelectric units 2 and 3 are rigidly secured.

In the seventh embodiment, like in the sixth one, the housing 17 (FIGS. 13 and 14) is a movable element and the rod 18 is a stationary element, the piezoelectric units 2" and 3" being rigidly secured to the rod 18 and are made in the form of sectors disposed in one transverse plane.

The motor according to the invention operates as follows, using the first embodiment by example.

The piezoelectric units 2 (FIG. 2) and 3 are made from identical shifting piezoelectric cells 5 and fixing piezoelectric cells 6. The operation of the piezoelectric units 2 and 3 is executed when a voltage of a respective polarity is applied on the electrodes of the piezoelectric cells. When the positive voltage is applied to the electrodes of the shifting piezoelectric cells 5, the inverse piezoelectric effect results in a displacement of the internal part leftwards relative to the external part secured in the housing 1. When the positive voltage is applied to the fixing piezoelectric cells 6, they clamp the movable part 4, because the vector of their polarization is directed perpendicularly to the longitudinal axis of the motor. The application of the negative voltage results in a reverse action: the shifting piezoelectric cells 5 move rightwards, while the fixing piezoelectric cells 6 are pushed apart from the movable part 4.

The working cycle consists of six time steps.

Figure 15:
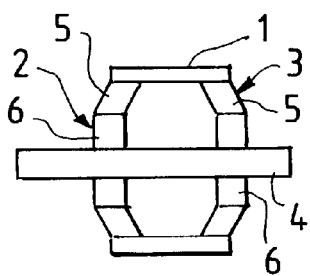
FIGS.15–20 are the time steps of the working cycle of the piezoelectric linear stepping motor.

The position corresponding to the first time step is shown in FIG.15. The positive voltage is applied to the shifting piezoelectric cell 5 of the piezoelectric unit 2 and to the fixing piezoelectric cells 6 of the piezoelectric units 2 and 3, and the negative voltage is applied to the shifting piezoelectric cell 5 of the piezoelectric unit 3. In this case the shifting piezoelectric cell 5 of the piezoelectric unit 3 is displaced rightwards while the shifting piezoelectric unit 5 of the piezoelectric unit 2 is displaced leftwards, the fixing piezoelectric cells 6 of both piezoelectric units squeeze the movable part 4 through the friction elements 8.

Figure 16:
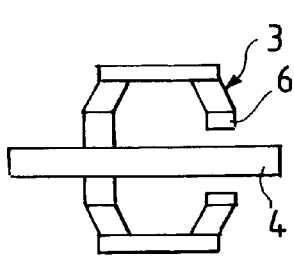

In the second time step the negative voltage is applied to the fixing piezoelectric cell 6 of the piezoelectric unit 6 (FIG. 16), and it is pushed apart from the movable part 4.

Figure 17:
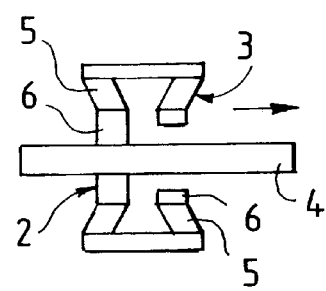

In the third time step the negative voltage is applied to the shifting piezoelectric cell 5 (FIG. 17) of the piezoelectric unit 2 and this cell, moving rightwards, displaces the fixing piezoelectric cell 6 and the movable parts 4 rightwards for one step. At the same time, the positive voltage is applied to the shifting piezoelectric cell 5 of the piezoelectric unit 3 and the latter moves leftwards together with the fixing piezoelectric cell 6.

Figure 18:
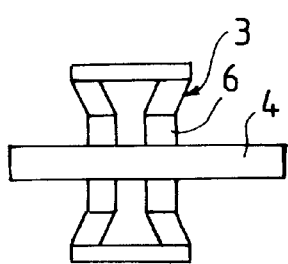

In the fourth time step the positive voltage is applied to the fixing piezoelectric cell 6 (FIG. 18) of the piezoelectric unit 3 and it squeezes the movable part 4.

Figure 19:
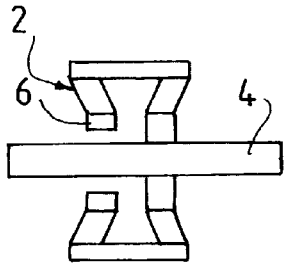

In the fifth time step the negative voltage is applied to the fixing piezoelectric cell 6 (FIG. 19) of the piezoelectric unit 2 and it is pushed apart from the movable part 4.

Figure 20:
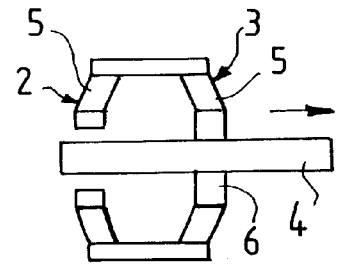

In the sixth time step the piezoelectric units 2 (FIG. 20) and 3 go apart i.e. the positive voltage is applied to the electrodes of the shifting piezoelectric cell 5 of the piezoelectric unit 2, and the unit 2 moves leftwards, whereas the negative voltage is applied to the shifting piezoelectric cell 5 of the piezoelectric unit 3 and it moves rightwards together with the fixing piezoelectric cell 6 and movable part 4. The movable part 4 is displaced for one more step. In so doing the working cycle is completed, the movable part 4 is displaced for two steps.

Then the process of linear displacement is continued in the same sequence.

In the process of the displacement of the housing the same working cycle is used but the shifting piezoelectric cells and fixing piezoelectric cells change places.

The reversing is executed by changing the sequence in applying the voltage to the fixing piezoelectric cells.

The use of several piezoelectric units connected in series will make it possible to increase considerably the force on the movable part.

The claimed piezoelectric stepping motor has a simple design and manufacturing technology, a small size and mass, a high force on the movable part and makes it possible to increase the positioning accuracy and to provide a uniform linear displacement.

In the description of the embodiments of the invention, for better understanding, a specific narrow terminology is used. However, the invention is not limited by the accepted terms and one should keep in mind that each such term covers all equivalent terms for the units working in a similar manner and used for the solution of the same technical problems.

Although the present invention is described in connection with preferable type of its realizations, it is clear that changes and modifications may be made without deviation from the idea and scope of the invention and those skilled in the art may easily understand that.

These changes and modifications are considered not extending beyond the essences and scope of the invention and the appended claims.

Industrial Applicability

The invention can be used as a slave mechanism in electrical engineering, radio engineering and automation technology.

What is claimed is:

1. A piezoelectric linear stepping motor comprising a housing having fixing units secured therein and a part movable relative to the housing, wherein the fixing units comprise at least two piezoelectric units, each piezoelectric unit comprising a shifting piezoelectric cell and a fixing piezoelectric cell separated from each other, from the housing and from a friction element by insulators, the fixing piezoelectric cells having a vector of polarization perpendicular to a longitudinal axis of the motor, and the shifting piezoelectric cells having a vector of polarization at an acute angle to the longitudinal axis of the motor, the piezoelectric units are disposed inside the housing one behind the other in a longitudinal plane, whereby the fixing cells sequentially engage and disengage the movable part, to grip the movable part, and whereby the shifting cells linearly shift the movable part.

2. The piezoelectric linear stepping motor as claimed in claim 1, wherein the housing has a form of a parallelepiped, the piezoelectric units are made the form of parallelepipeds disposed one behind the other in the longitudinal plane, and the movable part is made in the form of a rod having a rectangular cross section.

3. The piezoelectric linear stepping motor as claimed in claim 1, wherein the housing has a cut-out through which the movable part goes out of the housing.

4. The piezoelectric linear stepping motor as claimed in claim 1, wherein the movable part has at least one guide which enters a corresponding guide on the friction elements.

5. The piezoelectric linear stepping motor as claimed in claim 1, wherein the piezoelectric units are made in the form of a packet of piezoelectric plates, rings or their sectors which electrodes are connected in parallel alternately, in which case the direction of polarization of each successive piezoelectric plate, ring, or sector is opposite to that of the previous one.

6. The piezoelectric linear stepping motor as claimed in claim 1, wherein the gaps between the piezoelectric units are filled with an elastic insulating material.

7. The piezoelectric linear stepping motor as claimed in claim 1, wherein the housing is movable and the piezoelectric units are secured on a stationary rod.

8. A piezoelectric linear stepping motor according to claim 1, wherein the shifting cells and fixing cells of the first and second piezoelectric units are cylindrical.

9. A piezoelectric linear stepping motor comprising a housing having fixing units secured therein and a part movable relative to the housing, wherein the fixing units comprise at least two piezoelectric units, each piezoelectric unit comprising a shifting piezoelectric cell and a fixing piezoelectric cell separated from each other, from housing and from a friction element by insulators, the fixing piezoelectric cells having a vector of polarization perpendicular to a longitudinal axis of the motor, and the shifting piezoelectric cells having a vector of polarization at an acute angle to the longitudinal axis of the motor, the piezoelectric units are disposed inside the housing in the same transverse plane and have a form of sectors, whereby the fixing cells sequentially engage and disengage the movable part, to grip the movable part, and whereby the shifting cells linearly shift the movable part.

10. The piezoelectric linear stepping motor as claimed in claim 9, wherein the housing has a form of a polyhedron and the piezoelectric units are disposed in one transverse plane.

11. The piezoelectric linear stepping motor as claimed in claim 9, wherein it has at least two pairs of piezoelectric units disposed in a transverse plane.

12. A piezoelectric linear stepping motor according to claim 9, wherein the housing has a cut-out through which the movable part goes out of the housing.

13. A piezoelectric stepper motor according to claim 9, wherein the movable part has at least one guide which enters a corresponding guide on the friction elements.

14. A piezoelectric linear stepping motor according to claim 9, wherein the piezoelectric units are made in the form of a packet of piezoelectric plates, rings or their sectors which electrodes are connected in parallel alternately, in which the the direction of polarization of each successive piezoelectric plate, ring or sector is opposite to that of the previous one.

15. A piezoelectric linear stepping motor according to claim 9, wherein the gaps between the piezoelectric units are filled with an elastic insulating material.

16. A piezoelectric linear stepping motor according to claim 9, wherein the housing is made movable, and the piezoelectric units are secured on a stationary rod.

17. In a piezoelectric linear stepping motor having a longitudinal axis and having piezoelectric cells and a movable shaft, a method of moving the shaft in a single axial direction, comprising the steps of:
   a) frictionally engaging the shaft with first and second fixing piezoelectric cells, the first fixing piezoelectric cell being in a first axial position, the second piezoelectric cell being in a second axial position;
   b) releasing the shaft with the second fixing piezoelectric cell so that only the first fixing piezoelectric cell remains frictionally engaged to the shaft;
   c) shifting the first and second fixing piezoelectric cells in opposite axial directions so that the first fixing piezoelectric cell is shifted to a third axial position and the second fixing piezoelectric cell is shifted to a fourth axial position, thereby moving the shaft in the single axial direction;
   d) frictionally engaging the shaft with the second fixing piezoelectric cell;
   e) releasing the shaft with the first fixing piezoelectric cell so that only the second fixing piezoelectric cell remains frictionally engaged to the shaft;
   f) shifting the first and second fixing piezoelectric cells so that the first fixing piezoelectric cell is axially shifted back to the first axial position and the second piezoelectric cell is axially shifted back to the second axial position, thereby moving the shaft in the single axial direction; and
   g) repeating steps a) through f) to move the shaft, whereby the shaft is moved two steps in the single axial direction each time steps a) through f) are performed.

18. The method of claim 17, wherein steps c) and f) are performed by applying voltage to shifting piezoelectric cells coupled to the fixing piezoelectric cells.

19. In a piezoelectric linear stepping motor having a longitudinal axis and having piezoelectric cells and a movable housing, a method of moving the housing in a single axial direction, comprising the steps of:
   a) frictionally engaging the housing with first and second fixing piezoelectric cells, the first fixing piezoelectric cell being in a first axial position, the second piezoelectric cell being in a second axial position;
   b) releasing the housing with the second fixing piezoelectric cell so that only the first fixing piezoelectric cell remains frictionally engaged to the housing;
   c) shifting the first and second fixing piezoelectric cells in opposite axial directions so that the first fixing piezoelectric cell is shifted to a third axial position and the second fixing piezoelectric cell is shifted to a fourth axial position, thereby moving the housing in the single axial direction;

d) frictionally engaging the housing with the second fixing piezoelectric cell;

e) releasing the housing with the first fixing piezoelectric cell so that only the second fixing piezoelectric cell remains frictionally engaged to the housing;

f) shifting the first and second fixing piezoelectric cells so that the first fixing piezoelectric cell is axially shifted back to the first axial position and the second piezoelectric cell is axially shifted back to the second axial position, thereby moving the housing in the single axial direction; and g) repeating steps a) through f) to move the housing, whereby the housing is moved two steps in the single axial direction each time steps a) through f) are performed.

20. In a piezoelectric linear stepping motor having a longitudinal axis and having piezoelectric cells and a movable part, a method of moving the movable part in a single axial direction, comprising the steps of:

a) frictionally engaging the movable part with first and second sets of fixing piezoelectric cells, the first set of fixing piezoelectric cells being in a first set of axial positions, the second set of piezoelectric cells being in a second set of axial positions;

b) releasing the movable part with the second et of fixing piezoelectric cells so that only the first set of fixing piezoelectric cells remains frictionally engaged to the movable part;

c) shifting the first and second sets of fixing piezoelectric cells in opposite axial directions so that the first set of fixing piezoelectric cells is shifted to a third set of axial positions and the second set of fixing piezoelectric cells is shifted to a fourth set of axial positions, thereby moving the movable part in the single axial direction;

d) frictionally engaging the movable part with the second set of fixing piezoelectric cells;

e) releasing the movable part with the first set of fixing piezoelectric cells so that only the second set of fixing piezoelectric cells remains frictionally engaged to the movable part;

f) shifting the first and second fixing piezoelectric cells so that the first set of fixing piezoelectric cells is axially shifted back to the first set of axial positions and the second set of piezoelectric cells is axially shifted back to the second et of axial positions, thereby moving the movable part in the single axial direction; and g) repeating steps a) through f) to move the movable part in the single axial direction.

21. The method of claim 20, wherein steps c) and f) are performed by applying voltage to sets of piezoelectric shifting cells coupled to the sets of fixing piezoelectric cells.

* * * * *